United States Patent
Robbins et al.

(10) Patent No.: US 10,467,568 B1
(45) Date of Patent: Nov. 5, 2019

(54) SCALABLE WORKFLOW PROCESSING (75) Inventors: Alan Stuart Robbins, Mercer Island, WA (US); Srikanth Satyanarayana, Issaquah, WA (US); Richard M. Sears, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2342 days.

(21) Appl. No.: 12/489,960

(22) Filed: Jun. 23, 2009

Related U.S. Application Data (60) Provisional application No. 61/106,906, filed on Oct. 20, 2008.

(51) Int. Cl.
| | |
|---|---|
| *G06Q 10/00* | (2012.01) |
| *G06Q 10/06* | (2012.01) |
| *G06N 20/00* | (2019.01) |
| *G06F 21/60* | (2013.01) |
| *G06F 16/9535* | (2019.01) |

(52) U.S. Cl.
CPC ... *G06Q 10/06316* (2013.01); *G06F 16/9535* (2019.01); *G06F 21/602* (2013.01); *G06N 20/00* (2019.01)

(58) Field of Classification Search
None
See application file for complete search history.

(56) References Cited

U.S. PATENT DOCUMENTS

| | | | | | |
|---|---|---|---|---|---|
| 5,826,239 | A | * | 10/1998 | Du et al. | 705/7.26 |
| 5,870,545 | A | * | 2/1999 | Davis et al. | 709/201 |
| 6,041,306 | A | * | 3/2000 | Du et al. | 705/7.26 |
| 6,052,684 | A | * | 4/2000 | Du | |
| 6,845,507 | B2 | * | 1/2005 | Kenton | 719/314 |
| 7,966,282 | B2 | * | 6/2011 | Pinckney et al. | 706/62 |
| 8,032,480 | B2 | * | 10/2011 | Pinckney et al. | 706/62 |
| 2002/0035606 | A1 | * | 3/2002 | Kenton | 709/206 |
| 2003/0023675 | A1 | * | 1/2003 | Ouchi et al. | 709/203 |
| 2003/0061266 | A1 | * | 3/2003 | Ouchi | 709/106 |
| 2004/0039623 | A1 | * | 2/2004 | Setteducati | 705/8 |
| 2004/0141508 | A1 | * | 7/2004 | Schoeneberger et al. | 370/401 |
| 2005/0043979 | A1 | * | 2/2005 | Soares et al. | 705/7 |
| 2008/0065453 | A1 | * | 3/2008 | Settuducati | 705/8 |
| 2008/0120388 | A1 | * | 5/2008 | Ouchi | 709/206 |
| 2008/0140792 | A1 | * | 6/2008 | Ouchi | 709/206 |
| 2008/0140793 | A1 | * | 6/2008 | Ouchi | 709/206 |
| 2008/0288280 | A1 | * | 11/2008 | Belcher et al. | 705/2 |
| 2009/0307159 | A1 | * | 12/2009 | Pinckney et al. | 706/11 |

* cited by examiner

*Primary Examiner* — Gurkanwaljit Singh
(74) *Attorney, Agent, or Firm* — Thomas | Horstemeyer, LLP (57) ABSTRACT

Disclosed are various embodiments for scalable workflow processing. To this end, a workflow instance is placed in a queue accessible to a processor-based system, the queue being associated with a workflow. A workflow history associated with the workflow instance is applied to a decision application in response to a poll from the decision application, where the decision application is configured to determine a next action to be taken for the workflow instance. The next action to be taken for the workflow instance is initiated in the processor-based system based on a directive from the decision application generated based on the workflow history.

26 Claims, 4 Drawing Sheets

SCALABLE WORKFLOW PROCESSING

CROSS REFERENCE TO RELATED CASES

This application claims priority to U.S. Provisional Patent Application entitled "Scalable Workflow Processing" filed on Oct. 20, 2008 and assigned application No. 61/106,906, which is incorporated herein by reference in its entirety.

BACKGROUND

Workflow processing has become more and more complex over time. It can be difficult to implement workflow applications with current technologies that are not scalable and that do not offer the type of flexibility needed to handle significant complexity.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
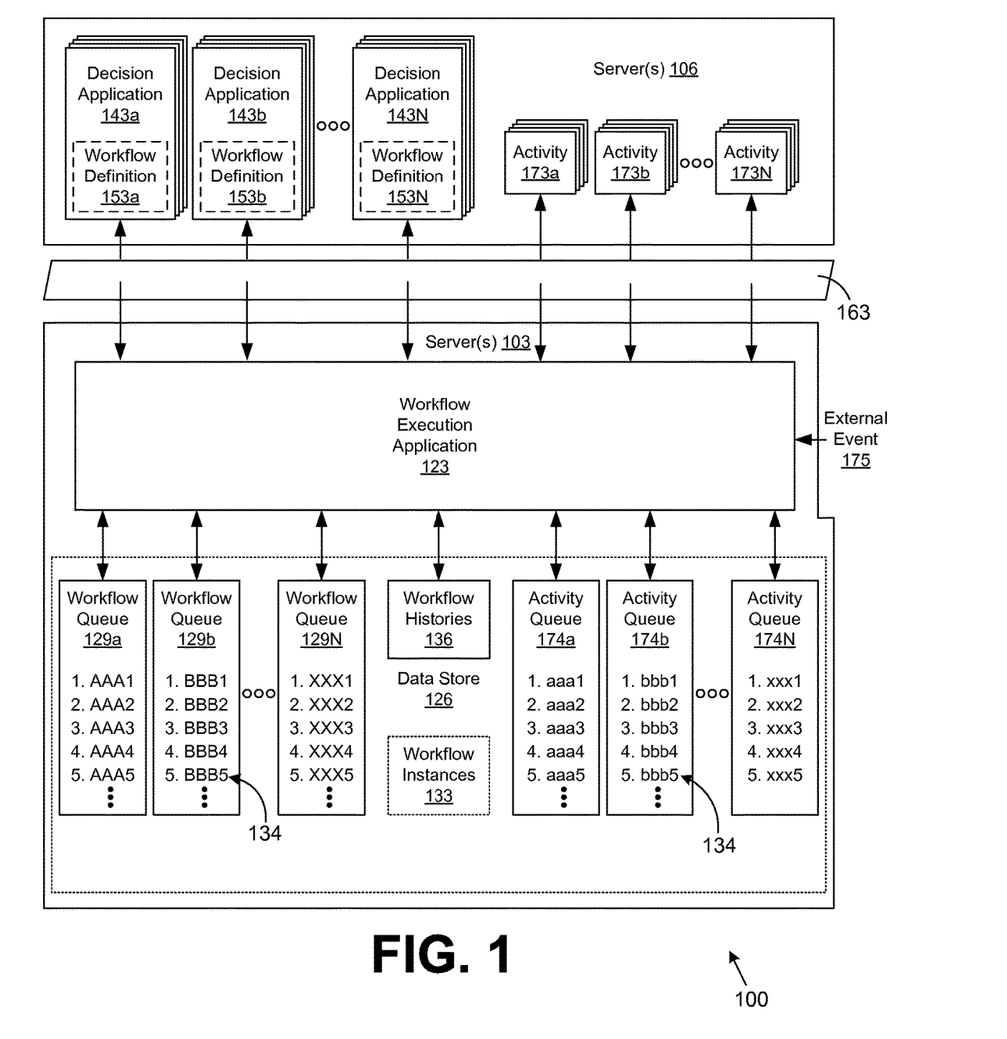
FIG. 1 is a drawing of a workflow processing system according to various embodiments of the present disclosure.

With reference to FIG. 1, shown is a workflow processing system 100 according to various embodiments. The workflow processing system 100 includes servers 103 and 106. Various components are executed in the servers 103 and 106 as will be described. To this end, the servers 103 and 106 may comprise individual servers or may represent multiple servers such as might be arranged, for example, in a server bank. The servers 103 or 106 may be in data communication with each other over the various networks. Such networks may comprise, for example, the Internet, intranets, wide area networks (WANs), local area networks, wireless networks, or other suitable networks, etc., or any combination of two or more such networks. As an additional alternative, all of the functional components executed in the various servers 103 and 106 may be executed within a single server or the same pool of servers as can be appreciated, where the configuration shown on FIG. 1 is presented as an example.

The servers 103 and 106 are processor based systems that are representative of the various types of processor based systems that may also be employed in their place. For example, each of the servers 103 and 106 may comprise server computers or other devices with like capability.

The server 103 includes a workflow execution application 123 and a data store 126. The workflow execution application 123 is executed to orchestrate the implementation of instances of workflows ("workflow instances") 133 as will be described. Stored in the data store 126 are several workflow queues 129a-N. Each workflow queue 129 is employed to temporarily store pointers 134 associated with the respective workflow instances 133. In order to place a workflow instance 133 into a workflow queue 129, a pointer 134 associated with such a workflow instance 133 is placed in the workflow queue 129, where the workflow instance 133 may be stored in an appropriate location in the data store 126 or other memory location.

The workflow represented by each workflow instance 133 is orchestrated by the workflow execution application 123. Each workflow queue 129 is associated with a predefined type of workflow. Each of the workflow queues 129 is designated to temporarily queue up workflow instances 133 of a predefined type. Also, a plurality of workflow histories 136 are stored in the data store 126. Each workflow history 136 is associated with a respective one of the workflow instances 133 processed by the workflow execution application 123. The workflow histories 136 each comprise, for example, a list of events that have occurred during the implementation of a given workflow instance 133 over time. To this end, the events listed in a given workflow history 136 act as a record of the implementation of a workflow instance 133. Such events may be expressed using, for example, extensible markup language (XML) or other such languages.

The various components implemented on the server 106 include decision applications 143a-N. Each of the decision applications 143 embodies a functional expression of a workflow definition 153a-N. To this end, each decision application 143 embodies a workflow definition 153 in the form of functional logic as may be expressed, for example, in terms of programmed code. In this respect, the decision applications 143 are stateless entities that process the workflow histories 136 accordingly. In one embodiment, each different decision application 143 comprises a class that may be instantiated multiple times. Thus, there may be many instances of various decision applications 143 executed by a server 106 at any given time. The decision applications 143 may be programmed using any one of a number of different existing programming languages as can be appreciated.

In some embodiments, the workflow execution application 123 in the server 103 may communicate with the decision applications 143 in the server 106 through a firewall 163. To this end, the decision applications 143 are programmed to facilitate communication through the firewall 163 without compromising the security of the applications implemented on the server 106. Specifically, the decision applications 143 are configured to poll the workflow execution application 123 when communicating so as to prevent exposing the decision applications 143 beyond the firewall 163 as will be described. Each of the decision applications 143 is configured to identify the activities, actions, or steps to be performed for a specific workflow instance 133 based upon the functional expression of a workflow definition 153 included therein as will be described.

The components executed on the server 106 include activities 173a-N. Each of the activities 173 is executed to perform one or more actions, tasks, or functions that comprise at least a portion of a given workflow instance 133 based upon a request from the workflow execution application 123 as will be described. The activities 173 may comprise a class that is instantiated multiple times to handle the workflow processing load from the workflow execution application 123 as will be described. An activity queue 174 is associated with each type or class of activity 173. The activities 173 are programmed to facilitate communication through the firewall 163 without compromising the security of the applications implemented on the server 106 in a manner similar to the decision applications 143.

The workflow processing system 100 is configured to implement workflow instances 133 that perform various functions. One example of such a workflow that may be embodied in workflow instances 133 might be a process to implement the payment for a purchase of an item online over the Internet. Such a process may involve various actions or tasks such as inputting a payment instrument such as a credit card number or other instrument, performing a fraud check on the payment instrument, and sending a shipment request to a fulfillment center to implement the fulfillment of the order. There may be many other actions or tasks involved in such a process, where the above actions or tasks are described merely for the purposes of illustration.

To this end, a workflow may involve various components, persons, applications, and other entities that are involved in the processing of data to complete a workflow instance 133. In the case of the processing of payment for an order, for example, such an order may be processed through various departments and other entities for ultimate authorization and purchase. A given workflow instance 133 may involve human intervention at some point, or may be entirely automated. The human intervention may involve interaction with a given activity 173 on the part of an individual as can be appreciated.

The workflow execution application 123 may receive external events 175 from processes that are external to the workflow execution application 123. For example, an external event 175 may involve a cancellation of a payment process that is currently being implemented due to an externally generated event indicated such a cancellation. The workflow execution application 123 takes appropriate action with respect to external events 175 as will be described.

Next, a general discussion of the workflow processing system 100 is described with respect to the implementation of various workflow instances 133 according to various embodiments. To begin, an application external to the workflow processing system 100 may initiate the implementation of a workflow instance 133 by placing such workflow instance 133 in an appropriate one of the workflow queues 129. The workflow execution application 123 ultimately orchestrates the implementation of the workflow instance 133.

To this end, the workflow instance 133 may be represented by various data that is stored in the data store 126 or other location accessible to the servers 103 and/or 106. For example, in the case that the workflow instance 133 involves the processing of a payment for an item purchased online, such data may comprise information about the user, the payment instrument, and other data as can be appreciated. An identifier may be associated with such data stored in a separate location.

Each of the workflow queues 129 is associated with a given type of workflow. The workflow instance 133 is placed in a respective one of the workflow queues 129 that is associated with the workflow type of the workflow instance 133. Similarly, every workflow instance 133 implemented by the workflow processing system 100 is placed in a respective one of the workflow queues 129 associated with the workflow type of the respective workflow instances 133. Each workflow type is scoped by a namespace that identifies such type. Ultimately, given that each decision application 143 embodies a given type of workflow definition 153, each workflow queue 129 is associated with a respective one of the decision applications 143 by virtue of the fact that both a workflow queue 129 and a decision application 143 are associated with a given workflow type.

The workflow execution application 123 is configured to respond to requests from the decision applications 143 for workflow instances 133 to implement. To this end, each instance of a decision application 143 polls the workflow execution application 123 to determine whether there are any workflow instances 133 represented in a corresponding workflow queue 129 for such decision application 143. In response to the poll, the workflow execution application 123 examines the respective workflow queue 129 to determine whether there are any workflow instances 133 listed therein that need to be advanced. Due to the fact that each decision application 143 may be instantiated multiple times, the number of instances of the decision applications 143 may be load balanced against their respective workflow queue 129.

Assuming that a workflow instance 133 is listed in a respective workflow queue 129 when a corresponding instance of a decision application 143 polls the workflow execution application 123, the workflow execution application 123 retrieves the workflow history 136 from the data store 126 for such workflow instance 133. The workflow execution application 123 also obtains the data associated with the respective workflow instance 133 from the data store 126 or other location. Once the respective workflow history 136 and other information embodying the workflow instance 133 are obtained, then the workflow execution application 123 provides the same to the polling decision application 143.

Once the workflow history 136 and other information embodying the workflow instance 133 are received by the respective decision application 143, then the decision application 143 examines the workflow history 136 in order to determine a next action to be taken for the respective workflow instance 133. To this end, the functional embodiment of the workflow definition 153 that makes up the respective decision application 143 is configured to review the workflow history 136 and identify a next action to be taken for the workflow instance 133. Thereafter, the decision application 143 sends a request to the workflow execution application 123 to schedule an activity 173 that performs the next action to be implemented with respect to the workflow instance 133. Alternatively, according to one embodiment, the decision application 143 may schedule multiple activities 173 to implement multiple actions in parallel.

In sending the workflow history 136 and other information representing the workflow instance 133 to one of the decision applications 143, the workflow execution application 123 keeps track of which decision application 143 is processing which workflow instance 133. This ensures that duplicate processing of workflow instances 133 is prevented. Such tracking may be performed by storing data at a suitable location such as the data store 126 or other location indicating which decision application 143 is processing a given workflow instance 133 or by some other approach as can be appreciated.

Upon receiving the request to schedule the implementation of an activity 173 with respect to a workflow instance 133, the workflow execution application 123 proceeds to initiate the next action to be taken with respect to the workflow instance 133 based on the directive from the respective decision application 143. To this end, this may involve placing the workflow instance 133 in a respective one or more of the activity queues 174 that is/are associated with a respective activity 173 to be performed. Note that by instantiating the respective activities 173, such instances may load balance against a respective activity queue 174 for respective activities 173. Alternatively, an activity 173 may be instantiated to process the respective workflow instance 133 as needed.

The action performed by the respective activities 173 may be atomic in nature and may involve steps or action associated with the workflow embodied in the workflow instance 133. Alternatively, an activity 173 may not be atomic in nature where the activity might involve the creation of a workflow instance 133 that is placed in one or more appropriate workflow queues 129 for further action. To this end, the workflow processing system 100 may comprise a compositional form as can be appreciated.

Once the activity 173 has completed performing the next action with respect to the workflow instance 133, the activity 173 sends a message to the workflow execution application 123 that such processing is complete. Thereafter, the workflow execution application 123 may proceed to list the workflow instance 133 in the corresponding workflow queue 129 once again so that the next action may ultimately be performed for the workflow instance 133.

It should be noted that a directive from a given decision application 143 indicates a next action to be taken for a workflow instance 133. Such action may comprise an action or task inherent in the workflow of the workflow instance 133, or such action may comprise closing the workflow instance 133 due to the fact that the workflow is complete. If the workflow is complete, then the workflow execution application 123 closes the workflow instance 133 by performing any needed closing tasks without applying the workflow instance 133 to an activity 173 as can be appreciated. Alternatively, an activity 173 may be employed that performs the closing tasks. Thereafter, the workflow instance 133 is not placed in a given workflow queue 129 since the workflow represented by such workflow instance 133 is complete.

In addition to the foregoing, the workflow execution application 123 also records events in the respective workflow histories 136 of the workflow instances 133 that it handles. To this end, each workflow history 136 lists all of the events or other activities that have occurred for a corresponding workflow instance 133. In particular, such events may comprise, for example, scheduling a workflow instance 133 to be processed by a decision application 143 or activity 173 by placing a workflow history 133 in a corresponding workflow queue 129 or activity queue 174. Such events may further include the start and completion of the processing of a workflow instance 133 by a respective decision application 143 or activity 173, or any timeouts that may occur with respect to the processing of a given workflow instance 133, etc. In addition, there may be many other events that are recorded in the workflow history 136 during the processing of a corresponding workflow instance 133. In addition, events may record various error conditions such as the failure of a decision application 143 to determine the next action to be performed, or the failure of an activity 173 to perform one or more tasks with respect to the workflow for a workflow instance 133, or other conditions.

Also, when the workflow execution application 123 receives an external event 175 from an external process, the workflow execution application 123 may record the external event 175 in a workflow history 136 of a workflow instance 133 and queue up the workflow instance 133 in an appropriate workflow queue 129 to be further processed. To this end, the decision applications 143 are programmed to handle the various external events 175 that might be encountered for a given type of workflow instance 133.

By virtue of the fact that the decision applications 143 poll the workflow execution application 123 for workflow instances 133 to be evaluated in order to determine the next actions to be taken, then the throughput of processing the various workflow instances 133 is controlled at least to some degree by the number of instances of the decision applications 143. The throughput may also be affected by the speed at which the workflow execution application 123 operates, etc.

Also, the polling by the decision applications 143 allows the decision applications 143 to exist behind the firewall 163 without exposing the functional aspects of the workflow execution application 123 or the decision applications 143. If a given one of the workflow queues 129 experiences a bottleneck such that the number of workflow instances 133 listed is too large, then one may increase the number of instances of a respective decision application 143 to increase the throughput for such workflow instances 133 listed in the respective workflow queue 129 and vice versa. Thus, the workflow processing system 100 provides an advantage in that it is scalable such that the throughput is controlled to some degree by the number of instances of the decision applications 143.

In addition, the workflow processing system 100 provides a further advantage in that the processing of workflows is much more flexible given that the workflow definitions 153 are embodied in functional code in the decision applications 143. To this end, the complexity and extensiveness of modern day workflows can be adequately represented using functional code that is flexible and can meet all exceptions or permutations of processing and is not restricted to data expressions of workflow instances 133 such as in the form of XML documents or other data forms that are processed by generic workflow processors.

Figure 2:
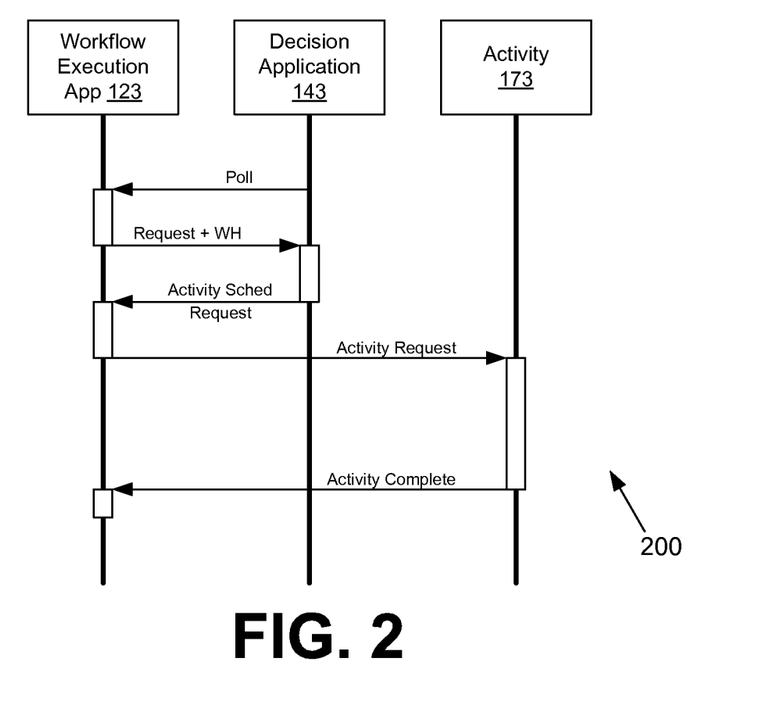
FIG. 2 is a drawing of a communication diagram that illustrates one example of communication between various components in the workflow processing system of FIG. 1 according to an embodiment of the present disclosure.

With reference to FIG. 2, shown is a communication diagram 200 that illustrates one example of communication occurring between the workflow execution application 123, a decision application 143, and an activity 173 as described above according to an embodiment of the present disclosure. To begin, the decision application 143 polls the workflow execution application 123 to determine whether there are any workflow instances 133 listed in a respective one of the workflow queues 129 (FIG. 1) that are to be processed by a respective decision application 143. The workflow execution application 123 then examines the respective workflow queue 129 to identify whether any workflow instances 133 are listed.

Assuming such is the case, then the workflow execution application 123 responds to the request sending the workflow history 136 (FIG. 1) and the information embodying the respective workflow instance 133 to the decision application 143 and requesting that the decision application 143 determine the next action to be taken for the workflow instance 133. The decision application 143 then examines the workflow history 136 and determines the next action to be taken. Ultimately, the decision application 143 generates a directive that is transmitted to the workflow execution application 123 indicating the next action to be taken with respect to the workflow instance 133. The directive may indicate the next action to be taken and may direct the scheduling of such action or other approach to be taken to implement the next action.

In response to the request from the decision application 143, the workflow execution application 123 then transmits an activity request to a respective one of the activities 173 requesting the respective action be performed by the activity 173. All needed data to perform the action may be included in the activity request, or the activity request may include a pointer that indicates where such information is stored to be accessed by the respective activity 173. When sending the activity request, the workflow execution application 123 may record an event in the workflow history 136 of the respective workflow instance 133. The activity 173 then proceeds to perform one or more tasks associated with the workflow instance 133.

Once the activity 173 has completed its one or more actions or tasks, then the activity 173 transmits a message to the workflow execution application 123 indicating that the activity 173 completed its actions/tasks. Upon receiving such message from the activity 173, the workflow execution application 123 records an event in the workflow history 136 of the respective workflow instance 133 indicating that the respective actions/tasks were performed by the respective activity 173. Thereafter, the workflow execution application 123 then places the workflow instance 133 back into the respective workflow queue 129 for further processing.

In the case that the processing of the respective tasks by the activity 173 was unsuccessful for some reason, the activity 173 may send a message indicating the failure or error to the workflow execution application 123. The workflow execution application 123 may record an event in the respective workflow history 136 indicating the failure or error, and then places the workflow instance 133 back into the respective workflow queue 129.

Figure 3:
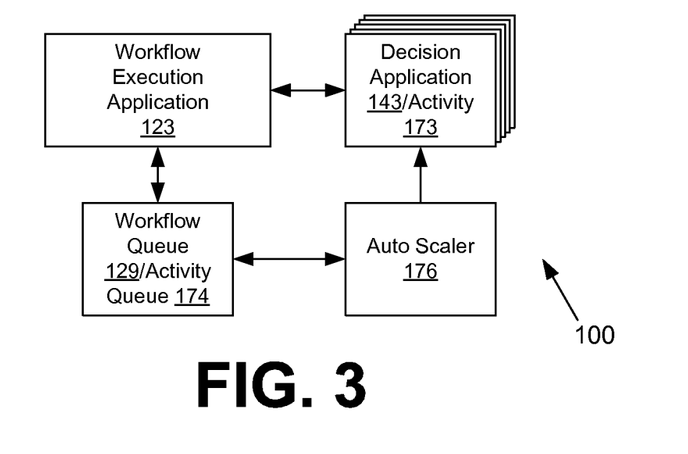
FIG. 3 is a drawing of a portion of the workflow processing system of FIG. 1 according to an embodiment of the present disclosure.

With reference to FIG. 3, shown is a portion of the workflow processing system 100 according to various embodiments. As shown, the workflow execution application 123 interacts with the decision applications 143 (FIG. 1) in order to determine the next steps to be performed for respective workflows as described above. To this end, the workflow instances 133 (FIG. 1) are listed in a respective workflow queue 129 (FIG. 1) where they are accessed when a decision application 143 polls the workflow execution application 123 for additional workflow instances 133 to be processed.

In addition, an auto scaler 176 may be implemented as an external component of the workflow processing system 100 that examines the number of workflow instances 133 listed in a respective workflow queue 129 and/or activity queue 174, and increases or decreases the number of instantiations of corresponding decision applications 143 and/or activities 173 so as to ensure proper processing throughput of workflow instances 133 without an overflow occurring in a workflow queue 129 or an activity queue 174. To this end, the more instantiations of a given decision application 143 or activity 173 that are executed at a given time, then the greater the throughput of processing the workflow instances 133 as can be appreciated.

Figure 4:
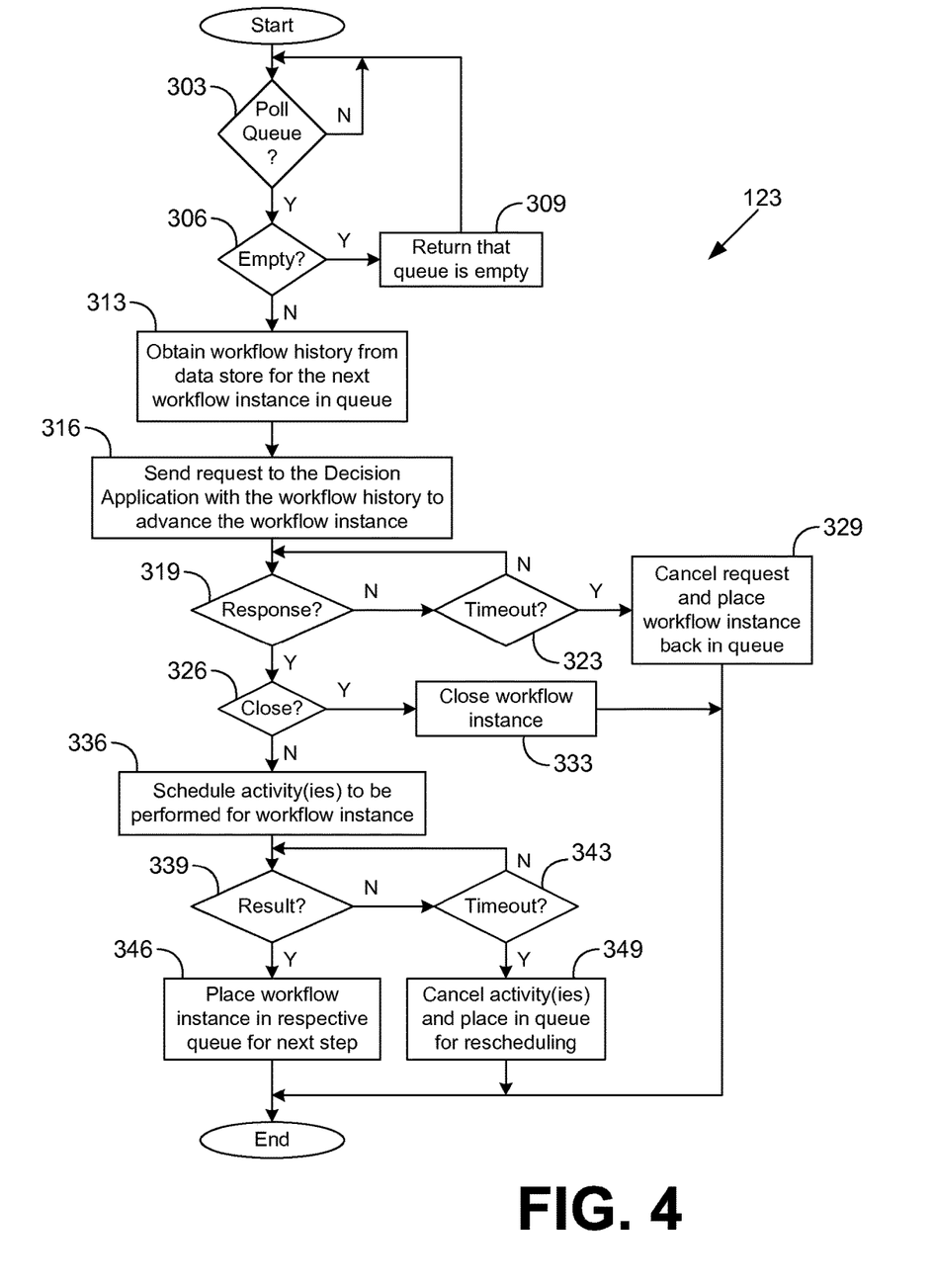
FIG. 4 is a flow chart that provides one example of functionality of a workflow execution application employed in the workflow processing system of FIG. 1 according to an embodiment of the present disclosure.

With reference to FIG. 4, shown is a flowchart that provides one example of the operation of the workflow execution application 123 according to various embodiments. It is understood that the flowchart of FIG. 4 merely provides an example of the many different types of functional arrangements that may be employed to implement the operation of the workflow execution application 123 as described herein. As an alternative, the flowchart of FIG. 4 may be viewed as depicting an example of steps of a method implemented in the server 103 (FIG. 1) according to one or more embodiments.

To begin, in box 303 the workflow execution application 123 waits to receive a poll from a decision application 143 (FIG. 1). Assuming that a poll is received, then in box 306 the workflow execution application 123 looks to see if the respective workflow queue 129 (FIG. 1) associated with the decision application 143 is empty. If so, a message is returned to the respective decision application 143 that the respective workflow queue 129 is empty. In such case, the decision application 143 may be configured to wait a predefined period of time before polling the workflow execution application 123 again to determine whether a workflow instance 133 (FIG. 1) is listed in a respective workflow queue 129. Alternatively, long polling techniques may be employed in which a poll is sent and a negative reply is not returned for a predefined period of time. If during this time workflow instances 133 are placed in the respective workflow queue 129, then a reply is immediately sent back to the polling decision application 143. Such long polling techniques may be employed to reduce the processing activity of the workflow execution application 123 in returning nulls in response to polls.

On the other hand, if the workflow queue 129 is not empty as determined in box 306, then the workflow execution application 123 proceeds to box 313 in which the workflow execution application 123 obtains the workflow history 136 (FIG. 1) associated with the respective workflow instance 133. In box 316, a request is sent to the respective decision application 143 along with the workflow history 136 and any needed information that embodies the workflow instance 133 in order to advance the progress of the workflow instance 133. To this end, the respective decision application 143 determines the next action to be taken for the workflow instance 133.

Thereafter, in box 319, the workflow execution application 123 determines whether it has received a response from the respective decision application 143 for the workflow instance 133. If not, then the workflow execution application 123 proceeds to box 323. Otherwise, the workflow execution application 123 moves to box 326. In box 323, the workflow execution application 123 determines whether a timeout has occurred after the workflow history 136 and other data was sent to the decision application 143. If not, then the workflow execution application 123 reverts back to box 319. In this manner, the workflow execution application 123 waits to receive a response for a timeout period as can be appreciated.

However, assuming that the timeout period has elapsed in box 323, then in box 329, the workflow execution application 123 cancels the request and places the workflow instance 133 back into the respective workflow queue 129 in a subsequent attempt at processing by the decision application 143*b* given the failure of the prior request. Also, any scheduling requests made by a current decision task are disregarded and subsequent events are ignored. In addition, the timeout is noted in the respective workflow history 136. Thereafter, the workflow execution application 123 ends as shown.

Assuming that a response was received in box 319, then in box 326 the workflow execution application 123 determines whether the response includes a directive to close the workflow instance 133 as the last action necessary to complete the workflow instance 133 has been completed. If such is the case, then the workflow execution application 123 proceeds to box 333 to close the workflow instance 133. Thereafter, the workflow execution application 123 ends as shown.

However, assuming that the workflow instance 133 is not to be closed as determined in box 326, then in box 336 the workflow execution application 123 schedules one or more activities 173 to be executed with respect to the workflow instance 133. To this end, a single activity 173 may be scheduled, or multiple parallel activities 173 may be scheduled. At the same time, the workflow execution application 123 records an event in the workflow history 136 of the workflow instance 133 for each activity 173 scheduled. The activity 173 may be scheduled for workflow instance 133, for example, by placing the workflow instance 133 in a respective activity queue 174 associated with a given activity 173 to be accessed and acted upon at a later time by the activity 173. Alternatively, the workflow instance 133 may be applied directly to an activity 173 so that the activity 173 may perform the respective task.

Assuming that the scheduling of the workflow instance 133 with one or more activities 173 is complete, then in box 339, the workflow execution application 123 determines whether it has received a result from the one or more activities 173. Note that when multiple parallel activities 173 are scheduled for a given workflow, each activity 173 may operate separately and may complete its task or timeout separately from others. If the workflow execution application 123 has not received a result from the one or more activities, then the workflow execution application 123 proceeds to box 343. On the other hand, if the workflow execution application 123 determines that a completed result is received from one or more activities 173 in box 339, then in box 346 the workflow instance 133 is placed in a respective one of the workflow queues 129 for implementation of the next action with respect to the workflow instance 133. Also, the workflow execution application 123 records one or more events in the workflow history 136 associated with the workflow instance 133 indicating the successful completion of the respective tasks by the one or more activities 173. Thereafter, the workflow execution application 123 ends.

Referring back to box 343, the workflow execution application 123 determines whether a timeout has occurred waiting for the one or more activities 173 to complete the one or more tasks for the workflow instance 133. If such is the case, then the workflow execution application 123 proceeds to box 349. If not, then the workflow execution application 123 reverts back to box 339. Thus, the workflow execution application 123 waits for a predefined period of time after a workflow instance 133 is applied to one or more activities 173 for expected replies. Note that since each activity 173 may operate separately and may complete its task or timeout separately from other activities 173, then the workflow application 123 may wait for a predefined period of time for each separate activity 173.

Assuming that a timeout has occurred in box 343, then in box 349 the workflow execution application 123 cancels the request to perform the action(s) or task(s) with the activities 173 and places the workflow instance 133 in one or more respective workflow queues 129 to allow for an action by an instance of a decision application 143, such as a reattempt at completing the respective action by the one or more activities 173. In canceling the request with a given activity 173, the workflow execution application 123 will also include an event in the respective workflow history 136 of the workflow instance 133 indicating the failure of the activity 173 to perform the respective one or more tasks of the activity 173.

Based on this failure, the next instance of a decision application 143 receiving the workflow history 136 of the workflow instance 133 will schedule the failed one or more activities 173 once more to be performed so as to ensure that the workflow instance 133 is properly executed. Alternatively, other action may be taken such as skipping an activity 173, compensating for the failure, or other action. Thereafter, the workflow execution application 123 ends as shown.

Figure 5:
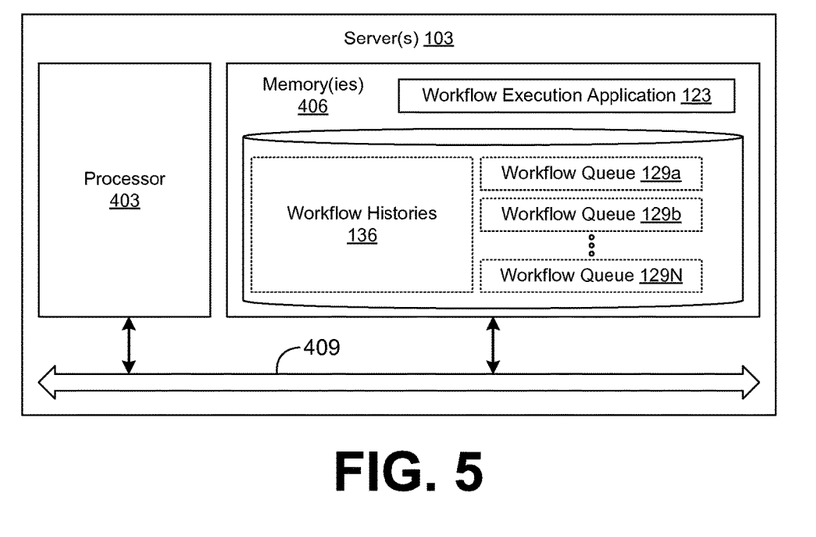
FIG. 5 is a schematic block diagram that illustrates one example of a server employed in the workflow processing system of FIG. 1 according to an embodiment of the present disclosure.

Referring next to FIG. 5, shown is a schematic block diagram of one example of a server 103 according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus or other bus structure as can be appreciated.

Stored in the memory 406 are both executable components and data. In particular, stored in the memory 406 and executable by the processor 403 are the workflow execution application 123 and potentially other applications. Also stored in the memory 406 are the workflow queues 129a-N and the workflow histories 136, and other data. In addition, a server operating system may be stored in the memory 406 and executable by the processor 403 as can be appreciated.

In addition, the server(s) 106 may comprise processor-based systems similar to that shown in FIG. 5.

It is understood that there may be other applications stored in the memory 406 and executable by the processor 403 as can be appreciated. Also, other data may be stored in the memory 406 and accessed by the processor 403 associated with the operation of the workflow execution application 123. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the servers 103 and/or 106 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 4 shows the functionality and operation of one example implementation of the workflow execution application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the workflow execution application 123, the decision applications 143, the activities 173, and/or any other component implemented in the servers 103 or 106 as described above comprises software or code, the same can be embodied in any computer-readable medium for use by or in connection with an instruction execution system such as, for example, a processor in a computer system or other system. In this sense, the systems or components executed in the servers 103 and 106 or other devices may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
placing a workflow instance in a queue accessible to a processor-based system, the queue being associated with a workflow definition for the workflow instance, where the processor-based system comprises a processor and a memory;
selecting in the processor-based system a decision application from a plurality of prospective decision applications based at least in part upon a poll from the decision application, the decision application being pre-configured to implement the workflow definition;
applying in the processor-based system a workflow history associated with the workflow instance to the decision application, where the decision application is configured to determine a next action to be taken for the workflow instance; and
initiating in the processor-based system the next action to be taken for the workflow instance based on a directive from the decision application generated based at least in part upon the workflow history.

2. The method of claim 1, further comprising determining whether a function of the decision application in determining the next action to be taken for the workflow instance of the decision application has timed out.

3. The method of claim 2, further comprising placing the workflow instance in the queue a second time if the function of the decision application has timed out.

4. The method of claim 1, further comprising executing a workflow execution application in the processor-based system to perform placing the workflow instance in the queue, selecting the decision application, applying the workflow history associated with the workflow instance to the decision application, and initiating in the processor-based system the next action to be taken for the workflow instance.

5. The method of claim 1, further comprising preventing duplicate processing of the workflow history of the workflow instance by tracking the application of the workflow history to the decision application.

6. The method of claim 1, further comprising closing the workflow instance in response to a directive from the decision application.

7. The method of claim 1, wherein initiating in the processor-based system the next action to be taken for the workflow instance further comprises applying the workflow instance to an activity process to perform the next action for the workflow instance.

8. The method of claim 1, wherein initiating in the processor-based system the next action to be taken for the workflow instance further comprises applying the workflow instance to a plurality of activity processes to perform a plurality of next actions in parallel for the workflow instance.

9. The method of claim 7, further comprising recording an event in the workflow history associated with the workflow instance indicating the initiation of the next action with respect to the workflow instance.

10. The method of claim 9, further comprising:
placing the workflow instance back into the queue in response to an indication from the activity process indicating that the next action has completed; and
recording the event in the workflow history associated with the workflow instance indicating the completion of the next action.

11. The method of claim 4, further comprising imposing a firewall between the decision application and the workflow execution application.

12. A system, comprising:
a processor-based system comprising a processor and a memory;
a workflow instance listed in a queue accessible to the processor-based system, the queue being associated with a type of workflow definition for the workflow instance;
a decision application being configured to determine a next action to be taken for the workflow instance comprising the type of workflow definition; and
a workflow execution application implemented in the processor-based system, the workflow execution application being configured to:
select the decision application from a plurality of prospective decision applications based at least in part upon a poll from the decision application, the decision application being pre-configured to implement the type of workflow definition;
apply a workflow history associated with the workflow instance to the decision application in order to determine the next action to be taken for the workflow instance; and
initiate the next action to be taken for the workflow instance based at least in part upon a directive from the decision application.

13. The system of claim 12, wherein the workflow execution application is further configured to track the application of the workflow history to the decision application to prevent duplicate processing of the workflow history of the workflow instance.

14. The system of claim 12, wherein the workflow execution application is further configured to close the workflow instance in response to the directive from the decision application.

15. The system of claim 12, wherein the workflow execution application initiates the next action to be taken for the workflow instance by applying the workflow instance to an activity process to perform the next action for the workflow instance.

16. The system of claim 15, wherein the workflow execution application is further configured to record an event in the workflow history associated with the workflow instance indicating the initiation of the next action with respect to the workflow instance.

17. The system of claim 16, wherein the workflow execution application is further configured to:
place the workflow instance back into the queue in response to an indication from the activity process indicating that the next action has completed; and
record the event in the workflow history associated with the workflow instance indicating the completion of the next action.

18. The method of claim 1, wherein the decision application is at least one of a subset of the plurality of prospective decision applications, and individual ones of the subset are pre-configured to implement the workflow definition.

19. The method of claim 18, further comprising initiating an adjustment to a quantity of the plurality of prospective decision applications in the subset in response to a length of the queue.

20. The system of claim 12, wherein the decision application is at least one of a subset of the plurality of prospective decision applications, wherein individual ones of the subset are pre-configured to implement the type of workflow definition.

21. The system of claim 20, wherein the workflow execution application is further configured to initiate an adjustment to a quantity of the plurality of prospective decision applications in the subset in response to a length of the queue.

22. A non-transitory computer-readable medium embodying a program executable in a computing device, the program comprising:
code that places a workflow instance in a queue, the queue being associated with a workflow definition for the workflow instance;
code that selects a decision application from a plurality of prospective decision applications based at least in part upon a poll from the decision application received through a firewall, the decision application being pre-configured to implement the workflow definition;
code that applies a workflow history associated with the workflow instance to the decision application, where the decision application is configured to determine a next action to be taken for the workflow instance; and
code that initiates the next action to be taken for the workflow instance based at least in part on a directive from the decision application generated based at least in part upon the workflow history.

23. The non-transitory computer-readable medium of claim 22, wherein the decision application is at least one of a subset of the plurality of prospective decision applications, wherein individual ones of the subset are pre-configured to implement the workflow definition.

24. The non-transitory computer-readable medium of claim 22, further comprising code that applies the workflow instance to an activity process to perform the next action for the workflow instance.

25. A system comprising:
at least one computing device configured to:
list a workflow instance in a queue accessible to the at least one computing device, the queue being associated with a type of workflow definition for the workflow instance;
generate a decision application being configured to determine a next action to be taken for the workflow instance comprising the type of workflow definition;
impose a firewall; and
implement a workflow execution application, the workflow execution application configured to:

select the decision application from a plurality of prospective decision applications based at least in part upon a poll from the decision application received through the firewall by the workflow execution application, the firewall being imposed between the decision application and the workflow execution application, the decision application being pre-configured to implement the type of workflow definition;

apply a workflow history associated with the workflow instance to the decision application in order to determine the next action to be taken for the workflow instance; and initiate the next action to be taken for the workflow instance based at least in part upon a directive from the decision application.

26. The system of claim 25, wherein the decision application is one of a subset of the plurality of prospective decision applications, wherein individual ones of the subset are pre-configured to implement the type of workflow definition.

\* \* \* \* \*